United States Patent [19]

Atwell

[11] Patent Number: 4,536,257
[45] Date of Patent: Aug. 20, 1985

[54] DESALINATION SYSTEM

[76] Inventor: George Atwell, 891 St. Gabriel Ave., St. Norbert, Manitoba, Canada, R3V 1E9

[21] Appl. No.: 374,071

[22] Filed: May 3, 1982

[30] Foreign Application Priority Data

May 6, 1981 [GB] United Kingdom ............... 8113804

[51] Int. Cl.³ .............................................. B01D 3/10
[52] U.S. Cl. .................................... 202/177; 202/205; 202/235; 203/DIG. 17
[58] Field of Search ............... 202/205, 177, 234, 235; 203/DIG. 17, 91

[56] References Cited

U.S. PATENT DOCUMENTS 3,278,396 10/1966 Parson ................................. 202/234
4,135,985 1/1979 La Rocca ............................ 202/177
4,302,297 11/1981 Humiston ............................ 202/205

Primary Examiner—Frank Sever
Attorney, Agent, or Firm—Stanley G. Ade

[57] ABSTRACT

In the preferred embodiment, a partition divides an upper chamber into an evaporating chamber and a condensing chamber with a fan in the partition transferring water vapor from the evaporating chamber into the condensing chamber. An external compressor or vacuum pump maintains the system at the desired negative pressure. A salt water intake extends upwardly from a source of salt water and into the evaporating chamber to form a pool therein. The condensed fresh water forms a pool in the condensing chamber which communicates via a vertical discharge column to a U type outlet at the base. An automatic blow down conduit extends from the base of the pool of the salt water in the evaporating chamber to discharge the heavily concentrated salt fraction of the salt water from time to time.

22 Claims, 5 Drawing Figures

DESALINATION SYSTEM

BACKGROUND OF THE INVENTION

This invention relates to new and useful improvements in desalination system and comprises two embodiments.

In either case, considerable reduction of power requirements is obtained and a semi-automatic system results.

Vast areas of the earth are now relatively unpopulated, which would be quite habitable and very productive if adequate water could be supplied. The hot deserts and their semi-arid adjacent lands are conspicuous in this respect. The sea is often accessible to these lands with its virtually limitless supply of water, needing only to be desalinated.

In these areas money is often limited by the low density of population. Often skilled workmen are scarce, and always they must be assembled with great difficulty and at great expense.

In these places, it is crucial that structures be solid, durable, simple to maintain and to operate.

Many devices have been proposed to desalinate sea water and other contaminated water, cheaply. In general, these include elaborate heat exchange arrangements where contaminated water flows through a plurality of tubes or where contaminated water flows over or is cascaded over hot fresh water tubes.

Pluralities of tubes add a capital expense and they increase maintenance costs and operational cost. Further, the very slight scale formation on them greatly reduces the rate of heat transfer. While much heat is given off at the point of condensation, the transfer of that heat is very slow since water transmits heat some 400 times less rapidly than does aluminum. Turbulence is often used in water flows to speed up heat transfer, but turbulence slows down the flow and when pumps are used, increases pumping costs.

Prior art known to the applicant includes the following United States patents:

U.S. Pat. No. 3,725,206—Foley—discloses a desalination plant wherein desalination is provided in a vacuum. A blower moves water vapour from one evacuated area to another. Dense brine and fresh water are removed from these areas by two separate vacuum-liquid pumps.

U.S. Pat. No. 3,390,057—Day—discloses an apparatus for vapour compression distillation of water which utilizes heat transferred from distilled water to vapourize supply water at a reduced pressure.

U.S. Pat. No. 3,494,835—Mahistre—shows a system for desalination of sea water which utilizes a compressor to draw saline water into a tube for vapourization in a vacuum and recycles heat from the condensed vapour to heat the saline water.

U.S. Pat. No. 4,267,022—Pitcher—discloses an apparatus for desalinizing water where heated saline water is evaporated in a low pressure zone created by a vacuum pump.

U.S. Pat. No. 3,930,960—Taylor —teaches a water purification system utilizing a blow down operation to eliminate solid wastes.

U.S. Pat. No. 3,725,205—Heen—discloses an apparatus for cleaning sewage water which employs a reduced pressure evaporation tank and which transfers the vapour to a condensing chamber.

U.S. Pat. No. 4,203,806—Diggs—discloses an apparatus for desalinating water wherein contaminated water is preheated by solar energy before vapourization in a vacuum chamber and the water vapour is condensed in a separate chamber at atmospheric pressure.

U.S. Pat. No. 4,052,267—McFee—shows a water distiller including a blower used to condense the vapourized water.

All of these patents are relatively involved and utilize several moving parts, all of which make such systems unsatisfactory for use in areas hereinbefore described.

SUMMARY OF THE INVENTION

The present invention overcomes disadvantages inherent with these patents.

One aspect of the invention consists of a desalination system comprising in combination a sealed evaporating chamber, intake means to supply water to said evaporating chamber, a sealed condensing chamber, fan means operatively extending between said evaporating chamber and said condensing chamber for transferring water vapor from evaporating chamber to said condensing chamber, an external compressor or vacuum pump operatively connected to said condensing chamber for maintaining said chambers at a negative pressure below the vapour pressure of the salt water, and fresh water outlet means operatively connected to said condensing chamber, said intake means for said salt water and said outlet means for said fresh waster being operatively located whereby the warmer fresh water will transfer heat to the cooler salt water.

Another advantage of the invention is to provide a device of the character herewithin described in which the evaporation chamber comprises a centrally located cylindrical column, said fan means being situated in the upper end of said column, an outer enclosure surrounding said cylindrical column and being concentric therewith, a concentric annular wall between said outer enclosure and said column defining an annular fresh water outlet column between said wall and said centrally located cylindrical evaporating column, the upper end of said outer enclosure being closed and defining said condensing chamber above said evaporating column, said concentric annular wall and said outer enclosure defining said intake means and being closed at the upper end thereof, and a further concentric annular wall adjacent to said first mentioned concentric annular wall and situated between said last mentioned wall and said enclosure and terminating spaced from the upper end of said intake means and defining a salt water downflow column and radially extending nozzle means operatively extending between adjacent the base of said downflow column and the interior of said evaporating chamber adjacent the lower end thereof.

A further aspect of the invention provides a device of the character herewithin described in which the intake means includes a vertically situated pipe of column, said fresh water outlet means including a vertically situated pipe or column and a common, vertically situated partition extending therebetween, an enclosure at the upper ends of said pipes or columns, said partition extending through said enclosure thereby defining said evaporating chamber on one side of said partition and said condensing chamber on the other side thereof, said intake pipe of column communicating at the lower end thereof with a source of salt water and at the upper end thereof to said evaporating chamber at a point spaced above the base thereof, said outlet pipe of column communicating at the upper end thereof with said condensing chamber, said fan means being situated in said partition within said enclosure and connecting between said evaporating chamber and said condensing chamber, said external compressor of vacuum pump being situated in said condensing chamber and a salt water blow down assembly situated in the base of said evaporating chamber.

Another advantage of the present invention is to provide a device of the character herewithin described which is simple in construction, economical in manufacture which contains the minimum of moving parts and which is well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
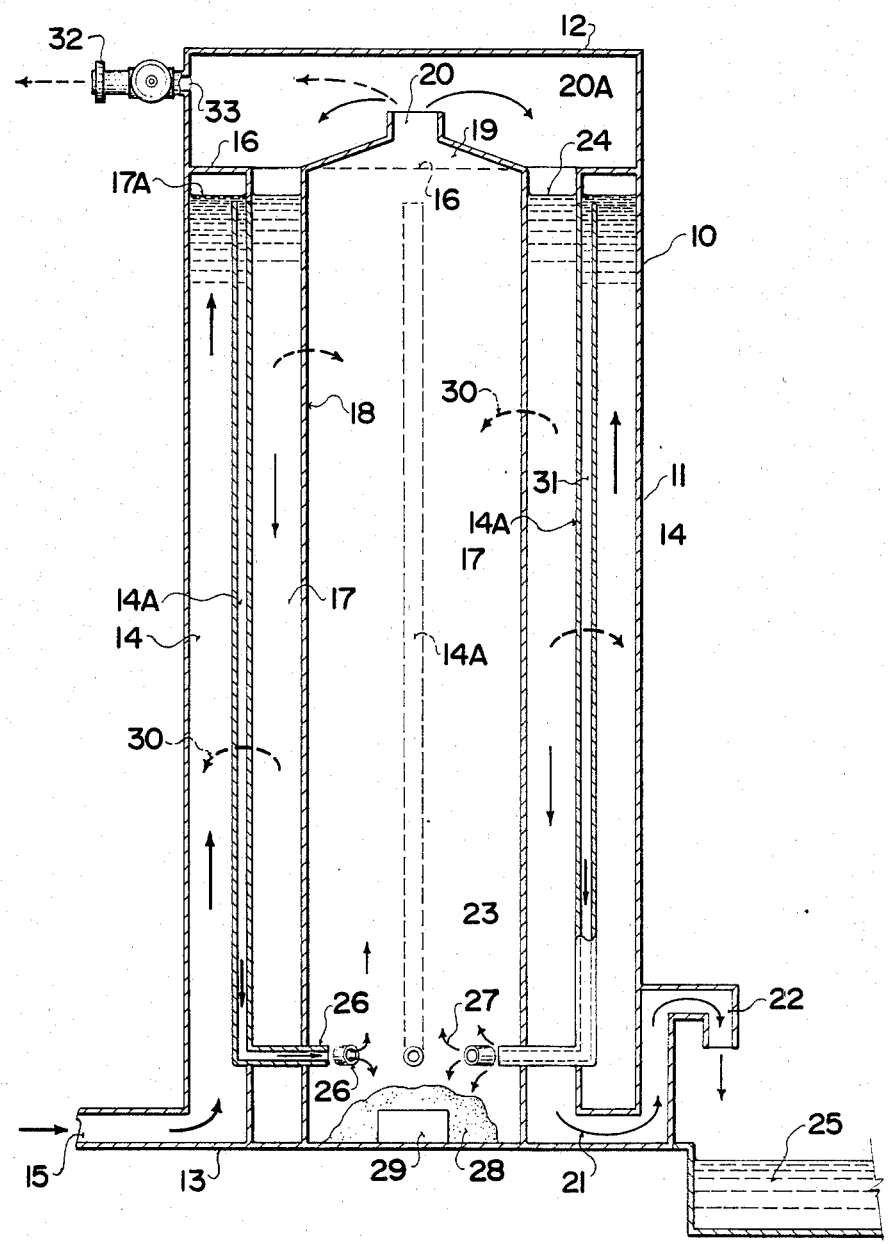
FIG. 1 is a schematic cross sectional view of the first embodiment of the desalination system.

Proceeding therefore to describe the invention in detail, reference should first be made to FIG. 1 which shows a sealed system including an outer casing 10 which is preferably cylindrical and includes the outer wall 11.

An upper wall 12 encloses the casing 10 and a base 13 supports the column or casing.

An annular saline water intake or column 14 is defined within the casing by means of an inner wall 14A with the untreated water entering via the lower intake 15. The annular chamber 14 is sealed by the annular upper wall 16 as clearly illustrated and a fresh water column or annular chamber 17 is defined annularly between the inner wall 14A and the outer wall of an evaporating chamber 18 situated centrally of the casing with reference character 17A indicating the operating water level in chamber 14. The operating water level in chamber 14 will be higher than in chamber 17 because of different vapour pressures in these chambers.

The upper end of the evaporating chamber or column 18 is closed as at 19 and a conventional vacuum pump 20 is situated in the upper wall 19 to maintain negative pressure within the evaporating chamber.

A fresh water outlet 21 is situated at the base of the fresh water annular chamber 17 with a U tube configuration being provided as at 22 so that as fresh water is formed, as will hereinafter be described, it exits via the lower end 23, through the U tube 22 with the fresh water level 24 being maintained at a lower level to the saline water 17A (see above). A fresh water storage area is indicated by reference character 25.

Water intake jets 26 extend through a wall of the evaporation chamber 18 and, due to the vacuum being maintained within chamber 18, at the saturated vapour pressure of the entering saline water, the fresh water vapour is drawn through the vacuum pump 20 into the condensing chamber 20A with the salt collecting in a pile 27 at the base 28 of the evaporation chamber 18. Means to extract the salt from time to time without breaking the vacuum, is indicated schematically by reference character 29 and may take the form of a conventional rotary valve lock.

Arrows 30 show the heat transfer from the fresh water column into the evaporating chamber and from the fresh water column to the incoming salt water column through the walls of the chambers.

The jets 26 are fed through a downflow column 31 of warmed salt water extending from the water level 17A which acts as the inlet, down to the jets 26.

A vacuum pump 32 is situated in the upper end of the casing within the condensing chamber or condenser 20A in order to evacuate the atmosphere therefrom and a valve 33 is situated between the pump 32 and the chamber 20A which can be closed off after the atmosphere has been evacuated therefrom. This valve, which is normally closed, is opened by an automatic switch which simultaneously starts the vacuum pump 32 when the pressure in the condenser 20A exceeds the vapour pressure of the fresh water condensing, by a predetermined, relatively small amount.

The start up procedure is as follows:

Valve 33 is opened and vacuum pump 20 is operated to achieve vacuum in the evaporation chamber 18 to perhaps 27 inches of mercury and continues to operate until the condensing chamber 20A also has a vacuum of approximately 27 inches of mercury thus stabilizing the system and allowing the pure water level 24 to rise therein to approximately 34 feet whereupon valve 33 is closed thus sealing the condensing chamber.

The salt water jets 26 are then opened into the evaporating chamber and the system is now in operation with fresh water discharging from the outlet 22 as it is formed in the condensation chamber 20A. The solids 27 fall to the bottom of the evaporating chamber and may be removed by valve 29 as desired and without breaking the system vacuum.

The advantage of this modification is that when the atmosphere is removed from the condensing chamber 20A, the resulting pressure in that chamber would merely be the vapour pressure of water, some ½ inch to 2.0 inches approximately of mercury instead of a normal pressure of over 30 inches as heretofore. This reduces the work load on the compressor 20 to approximately 1/30th or less of what it would be without having achieved an initial vacuum in the condensing chamber by means of the vacuum pump 32.

The pressure difference against which compressor or vacuum pump 20 must operate, is substantially reduced and this reduces operating costs.

It should be noted that the downflowing column of fresh water 17, held up by vacuum, in sealed from entry of atmospheric air 22 by the upturned U tube configuration of the outlet which is in continuous connection with the fresh water column 17.

Figure 2:
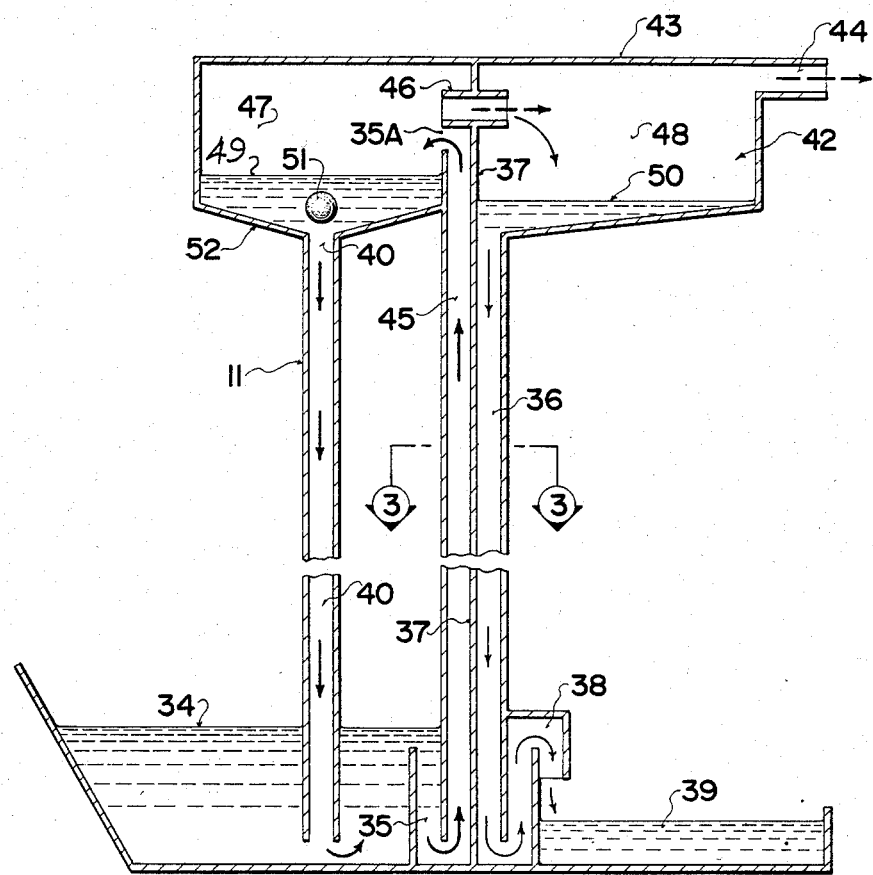
FIG. 2 is a schematic cross section of the preferred embodiment.
Figure 3:
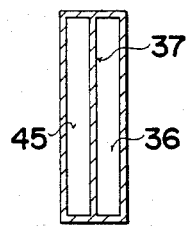
FIG. 3 is a schematic cross sectional view along the line 3—3 of FIG. 2.

In the preferred embodiment shown in FIGS. 2 and 3, the device is designed for use, for example, in or in conjunction with, a source of sea water or other saline source, the level of which is indicated by reference character 34.

An intake pipe 35 is provided in conjunction with a fresh water outlet pipe 36 with vertical partition 37 separating the two columns thus formed. Reference character 38 indicates a U tube type fresh water outlet to a fresh water storage container or sump 39 similar to the outlet 22 hereinbefore described.

A blow down tube 40 is also provided terminating within the source of sea water or the like 34 as clearly shown in FIG. 2 and the vertically situated conduits or pipes communicate with an enclosure 42 at the upper ends thereof divided by the aforementioned vertical partition 37 which extends upwardly to the closed upper end 43 of the enclosure 42. An external compressor or vacuum pump 44 is situated in the portion 48 of the enclosure 42 communicating with the fresh water intake column 36 and a low pressure high volume fan 46 is situated within the partition and communicates between the portion 47 of the enclosure and the portion 48 thereof. Portion 47 is the salt or saline water section or evaporating section and portion 48 is the fresh water section or condensing section.

Reference character 49 illustrates the operating level of the salt water and reference character 50 indicates the operating level of the fresh water approximately. The newly formed water in condensation chamber is warmer than the raw or salt water in the evaporation chamber 47. Chamber 47 gives up the heat of evaporation and chamber 48 gains it as the heat of condensation.

Because of the difference in temperature, the vapour pressure above the surface 50 in chamber 48 is greater than that above surface 49 in chamber 47. It follows that atmospheric pressure sustains a lesser height of water in pipe 36 and tank 48 than that which it sustains in blow down pipe 40 and tank 47.

A buoyant ball 51 is provided within the base of the chamber 47 which includes sloping lower walls 52 and the density of this ball is similar to that of the saline blow down desired so that when the ball engages the entry of the blow down tube 40, it seals off the blow down tube.

As the operation of blower 46 continues to cause the evaporation of water on surface 49 in chamber 47, the already salty water in chamber 47 gets an increasing concentration of salt. Salt being of much greater density than water, the water with the greater salt concentration sinks to the bottom of chamber 47. The incoming water is thus always the least salty and tends to stay on the surface.

Where, for example, it is decided to let a third of incoming water blow down, and if the incoming raw water contains 3.5% of salt with a gravity of 1.035, then the gravity ball 51 should have a gravity of 1.00+3 (0.035) or 1.105. 1.105 would be the S.G. of the blow down.

It will be seen that water of less S.G. would not support the ball of such S.G. and would let the ball rest on the bottom of the tank closing opening 40.

Concentrations of S.G. above 1.105 would float the ball and drain away the heavy salt water fraction until the S.G. stabilizes thus letting the ball sink and seal off the blow down tube 11.

In operation, vacuum pump 44 pumps down the chambers 47 and 48 with water being allowed to rise in pipe or columns 36 and 45 to establish the pools defined by the water levels 50 and 49 respectively. Air will have moved through the fan 46 and vacuum pressure will then have been established in the chambers 47 and 48 of, for example, slightly above 0.0312 atmospheres, the vapour pressure of water, assuming water temperature is 25° C. The level of the water at surface 49 will be approximately 34 feet and that of surface 50, somewhat less.

Once the desired vacuum is achieved, fan 46 is operated and vapour will condense into additional fresh water in chamber 48 causing the water to overflow from the outlet 38 into the reservoir 39.

At the same time, replacement water will be sucked through the salt water intake 35 into the pool in chamber 47, the level of which is defined by reference character 49.

The external compressor of vacuum pump 44 will be provided with conventional controls (not illustrated) to cut in automatically in order to maintain the required vacuum pressure within chambers 47 and 48. This may be necessitated by leaks into the chambers and also by air entrained in the incoming water.

An approximation of the minimum energy costs that the system is envisaged to obtain is as follows:

At 25° C. 1 cubic foot of water becomes 43,400 cubic feet of vapour and at this temperature, the difference in vapour pressure between sea water and pure fresh water is 1.84% of the vapour pressure of pure water.

If this water vapour is pumped through a conduit of 1 square foot cross section, the pressure difference at the boundary of the two vapour chambers is as follows:

$$(0.0184 \times 0.0312 \times 14.7 \times 144) \text{ lbs} = 1.215 \text{ lbs}.$$

on the cross section.

To pump 43,400 cubic feet of vapour across the section requires $43,400 \times 1.215$ foot lbs. of work.

In order for this to be done in one minute, this would require $43,400 \times 1.215/33,000$ horsepower = 1.598 horsepower or 1.192 kw (1 horsepower = 0.746 kw).

Thus, 1 cubic foot of water will be desalinated in one minute for 1.192 kw per minute.

One kwh of power would desalinate $(60 \times 1 \times 62.25)/(10.25 \times 1.192) = 305.70$ gallons.

Figure 4:
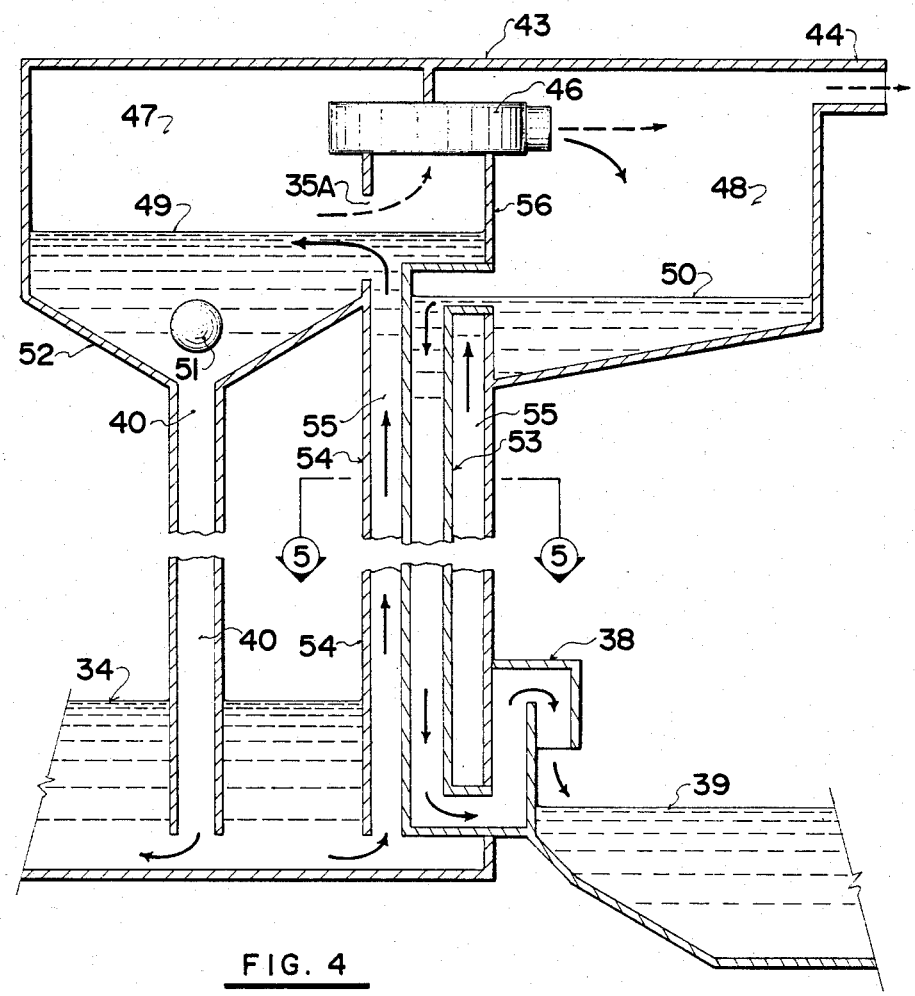
FIG. 4 is a schematic cross sectional view of an additional embodiment of the invention.
Figure 5:
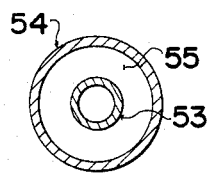
FIG. 5 is a cross sectional view of the conduits per se substantially along the line 5—5 of FIG. 4.

FIG. 4 shows an additional embodiment which is in effect a modification of the system illustrated and described in FIGS. 2 and 3.

In this particular embodiment, similar reference characters have been given where common parts occur.

The principal difference is the construction of the inlet and outlet means. In this embodiment, a cylindrical inner casing or conduit 53 is surrounded by a concentrically located outer conduit 54. The inner conduit constitutes the fresh water outlet similar to conduit 36 and terminates in the U tube discharge lower end 38 into the fresh water sump or collector 39.

The outer column or conduit 54 defines an annular space 55 between the outer conduit and the inner conduit 53 which constitutes the salt water intake similar to 45 hereinbefore described.

These concentric conduits are secured to the base of the enclosure 43 and part of the inner conduit 53 extends upwardly through the enclosure 43 and acts as a partition 56 similar to partition 37 hereinbefore described, with the fan 46 being situated therein and operating in a similar manner.

At the upper end of the outer conduit 54, within the evaporating chamber 47, the discharge 35A is provided to provide the pool of salt water having a level indicated by reference character 49.

The assembly operates in a manner similar to that hereinbefore described for FIGS. 2 and 3, the advantage being a greater area of heat conducting material constituted by the cylindrical wall of the conduit 53 so that heat from the fresh water passing downwardly through this condiuit 53, transfers to a greater degree, to the cool salt water passing upwardly through the annular space 55.

It will be noted that the salt water is taken upwardly in a large diameter pipe, from the source, and emitted through opening 35A and into the condensing chamber.

The condensed water is taken downwardly by a pipe of lesser diameter that enters the larger pipe, throught its wall, from the condensing chamber, passes down the middle of the salt water pipe and exits through its wall, near its lower end, to deliver fresh water to outlet pipe 38.

This arrangement allows for some heat exchange without going to extraordinary expense and costly complexity to achieve it.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A desalination system comprising in combination a sealed evaporating chamber, intake and return means for connection to a supply of salt water for circulating salt water to said evaporating chamber for evaporation, a sealed condensing chamber, conduit means operatively extending between said evaporating chamber and said condensing chamber for transferring water vapour from said evaporating chamber to said condensing chamber, an external vacuum pump operatively connected to one of said evaporating and condensing chambers and designed so as in operation to maintain said chambers at a pressure closely approaching the vapour pressure of water at ambient temperature, fresh water outlet means operatively connected to said condensing chamber, and means for condensing said water vapour in said condensing chamber said condensing means consisting of fan means for transferring water vapour through said conduit means from said evaporating chamber to said condensing chamber whereby said water vapour condenses without contacting a cooling medium.

2. The system according to claim 1 in which said evaporating chamber comprises a centrally located cylindrical column, said fan means being situated in the upper end of said column, an outer enclosure surrounding said cylindrical column and being concentric therewith, a concentric annular wall between said outer enclosure and said column defining an annular fresh water outlet column between said wall and said centrally located cylindrical evaporating column, the upper end of said outer enclosure being closed and defining said condensing chamber above said evaporating column, said concentric annular wall and said outer enclosure defining said intake means and being closed at the upper end thereof, and a further concentric annular wall adjacent to said first mentioned concentric annular wall and situated between said last mentioned wall and said enclosure and terminating spaced from the upper end of said intake means and defining a salt water downflow column and radially extending nozzle means operatively extending between adjacent the base of said downflow column and the interior of said evaporating chamber adjacent the lower end thereof.

3. The system according to claim 2 which includes solids removal means at the base of said evaporating chamber.

4. The system according to claim 3 in which said fresh water outlet means includes an inverted U tube outlet lower end, said external compressor or vacuum pump maintaining the water levels of said salt water and said fresh water adjacent the upper end of the intake means and fresh water outlet column respectively.

5. The system according to claim 2 in which said fresh water outlet means includes an inverted U tube outlet lower end, said external compressor or vacuum pump maintaining the water levels of said salt water and said fresh water adjacent the upper end of the intake means and fresh water outlet column respectively.

6. The system according to claim 1 which includes solids removal means at the base of said evaporating chamber.

7. The system according to claim 1 in which said intake means includes a vertically situated pipe or column, said fresh water outlet means including a vertically situated pipe or column and a common, vertically situated partition extending therebetween, an enclosure at the upper ends of said pipes or columns, said partition extending through said enclosure thereby defining said evaporating chamber on one side of said partition and said condensing chamber on the other side thereof, said intake pipe or column communicating at the lower end thereof with a source of salt water and at the upper end thereof to said evaporating chamber at a point spaced above the base thereof, said outlet pipe or column communicating at the upper end thereof with said condensing chamber, said fan means being situated in said partition within said enclosure and connecting between said evaporating chamber and said condensing chamber, said external compressor or vacuum pump being situated in said condensing chamber and a salt water blow down assembly situated in the base of said evaporating chamber.

8. The system according to claim 7 in which said partition transfers heat from the fresh water in said outlet pipe or column to the salt water in said inlet pipe or column.

9. The system according to claim 8 in which said fresh water outlet means includes an inverted U tube outlet lower end, said external compressor or vacuum pump maintaining the water levels of said salt water and said fresh water adjacent the upper end of the intake means and fresh water outlet column respectively.

10. The system according to claim 8 in which said blow down assembly includes a vertically situated blow down pipe or column extending down from and being operatively connected to the base of said evaporating chamber, a control ball in said evaporating chamber normally engaging with the upper end of said blow down pipe or column in sealing relationship therewith, the specific gravity of said control ball being such that it moves upwardly from said upper end of said blow down tube or column when the specific gravity of the salt water around said upper end exceeds a predetermined amount thereby releasing a fraction of the salt water from said evaporating chamber to said blow down tube, the base of said evaporating chamber converging downwardly towards said blow down tube.

11. The system according to claim 7 in which said fresh water outlet means includes an inverted U tube outlet lower end, said external compressor or vacuum pump maintaining the water levels of said salt water and said fresh water adjacent the upper end of the intake means and fresh water outlet column respectively.

12. The system according to claim 11 in which said blow down assembly includes a vertically situated blow down pipe or column extending down from and being operatively connected to the base of said evaporating chamber, a control ball in said evaporating chamber normally engaging with the upper end of said blow down pipe or column in sealing relationship therewith, the specific gravity of said control ball being such that it moves upwardly from said upper end of said blow down tube or column when the specific gravity of the salt water around said upper end exceeds a predetermined amount thereby releasing a fraction of the salt water from said evaporating chamber to said blow down tube, the base of said evaporating chamber converging downwardly towards said blow down tube.

13. The system according to claim 7 in which said blow down assembly includes a vertically situated blow down pipe or column extending down from and being operatively connected to the base of said evaporating chamber, a control ball in said evaporating chamber normally engaging with the upper end of said blow down pipe or column in sealing relationship therewith, the specific gravity of said control ball being such that it moves upwardly from said upper end of said blow down tube or column when the specific gravity of the salt water around said upper end exceeds a predetermined amount thereby releasing a fraction of the salt water from said evaporating chamber to sid blow down tube, the base of said evaporating chamber converging downwardly towards said blow down tube.

14. The system according to claim 1 in which said return means includes a blow down pipe extending down from and being operatively connected to the base of said evaporating chamber, a control ball in said evaporating chamber normally engaging with the upper end of said blow down pipe in sealing relationship therewith, the specific gravity of said control ball being such that it moves upwardly from said upper end of said blow down tube or column when the specific gravity of the salt water around said upper end exceeds a predetermined amount thereby releasing a fraction of the salt water from said evaporating chamber to said blow down tube.

15. The system according to claim 1 which includes a cylindrical outer casing and a concentrically located cylindrical inner casing, said inner casing defining said outlet means, the annular space defined between said outer casing and said inner casing defining said intake means, an enclosure at the upper ends of said inner and outer casings, part of said inner casing extending upwardly through said enclosure and acting as a partition thereby defining said evaporating chamber on one side thereof and said condensing chamber on the other side thereof, said intake means communicating with said evaporating chamber at the lower end thereof but spaced above the base thereof, said outlet means communicating with the base of said condensing chamber, said intake means communicating with a source of salt water at the base thereof, said fan means being situated in said partition within said enclosure and connecting between said evaporating chamber and said condensing chamber, said external compressor or vacuum pump being situated in said condensing chamber, and a salt water blow down assembly at the base of said evaporating chamber.

16. The system according to claim 15 in which said inner casing transfers heat from the fresh water inset outlet means to the salt water inset intake means.

17. The system according to claim 16 in which said fresh water outlet means includes an inverted U tube outlet lower end, said external compressor or vacuum pump maintaining the water levels of said salt water and said fresh water adjacent the upper end of the intake means and fresh water outlet column respectively.

18. The system according to claim 17 in which said blow down assembly includes a vertically situated blow down pipe or column extending down from and being operatively connected to the base of said evaporating chamber, a control ball in said evaporating chamber normally engaging with the upper end of said blow down pipe or column in sealing relationship therewith, the specific gravity of said control ball being such that it moves upwardly from said upper end of said blow down tube or column when the specific gravity of the salt water around said upper end exceeds a predetermined amount thereby releasing a fraction of the salt water from said evaporating chamber to said blow down tube, the base of said evaporating chamber converging downwardly towards said blow down tube.

19. The system according to claim 16 in which said blow down assembly includes a vertically situated blow down pipe or column extending down from and being operatively connected to the base of said evaporating chamber, a control ball in said evaporating chamber normally engaging with the upper end of said blow down pipe or column in sealing relationship therewith, the specific gravity of said control ball being such that it moves upwardly from said upper end of said blow down tube or column when the specific gravity of the salt water around said upper end exceeds a predetermined amount thereby releasing a fraction of the salt water from said evaporating chamber to said blow down tube, the base of said evaporating chamber converging downwardly towards said blow down tube.

20. The system according to claim 15 in which said fresh water outlet means includes an inverted U tube outlet lower end, said external compressor or vacuum pump maintaining the water levels of said salt water and said fresh water adjacent the upper end of the intake means and fresh water outlet column respectively.

21. The system according to claim 17 in which said blow down assembly includes a vertically situated blow down pipe or column extending down from and being operatively connected to the base of said evaporating chamber, a control ball in said evaporating chamber normally engaging with the upper end of said blow down pipe or column in sealing relationship therewith, the specific gravity of said control ball being such that it moves upwardly from said upper end of said blow down tube or column when the specific gravity of the salt water around said upper end exceeds a predetermined amount thereby releasing a fraction of the salt water from said evaporating chamber to said blow down tube, the base of said evaporating chamber converging downwardly towards said blow down tube.

22. The system according to claim 15 in which said blow down assembly includes a vertically situated blow down pipe or column extending down from and being operatively connected to the base of said evaporating chamber, a control ball in said evaporating chamber normally engaging with the upper end of said blow down pipe or column in sealing relationship therewith, the specific gravity of said control ball being such that it moves upwardly from said upper end of said blow down tube or column when the specific gravity of the salt water around said upper end exceeds a predetermined amount thereby releasing a fraction of the salt water from said evaporating chamber to said blow down tube, the base of said evaporating chamber converging downwardly towards said blow down tube.

* * * * *